Sept. 12, 1939.    H. B. COOKE ET AL    2,172,436
HYDROCARBON TREATMENT
Filed July 31, 1937
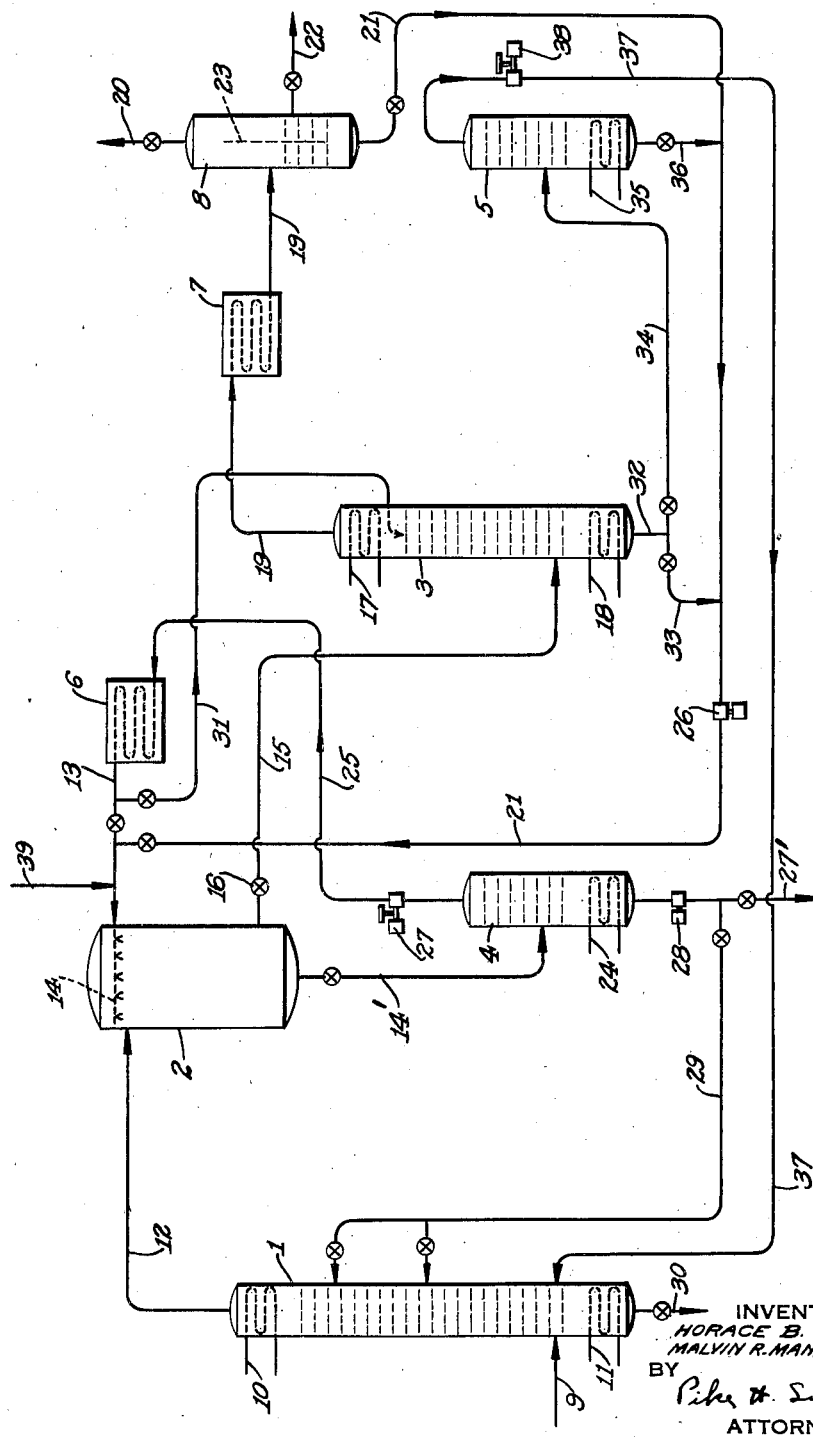
INVENTORS
HORACE B. COOKE
MALVIN R. MANDELBAUM
BY
Pike H. Sullivan
ATTORNEY Patented Sept. 12, 1939

2,172,436

UNITED STATES PATENT OFFICE 2,172,436

HYDROCARBON TREATMENT

Horace B. Cooke, Alexandria, Va., and Malvin R. Mandelbaum, New York, N. Y., assignors to The Gray Processes Corporation, Newark, N. J., a corporation of Delaware Application July 31, 1937, Serial No. 156,688

12 Claims. (Cl. 196—13)

This invention relates to the treatment of cracked petroleum vapors consisting essentially of motor-fuel constituents to improve their properties as motor fuel. More particularly, the invention relates to the treatment of such vapors to remove undesirable gum-forming constituents therefrom and simultaneously incorporate in the resulting motor fuel a small proportion of an added material for the purpose of stabilizing the motor fuel against deterioration or for improving the firing or anti-detonating properties of the motor fuel.

Cracked petroleum vapors are ordinarily treated to fractionate therefrom higher-boiling constituents and obtain vapors of a desired end point. The vapors may then be treated to remove undesired gum-forming constituents by passage of the vapors in contact with solid adsorbent catalytic material, such as fuller's earth, to effect polymerization of the undesired gum-forming materials to products higher boiling than the motor fuel. The polymers thus formed may condense on the catalytic material or may be carried along as vapors with the motor-fuel vapors and may be separated by fractionation in a subsequent step. Ordinarily, a substantial proportion of such polymers is condensed on the solid catalytic material where they are subject to the action of the hot vapors passing in contact with the catalytic material. Ordinarily, the greater part of such deposited polymers is sufficiently fluid to flow to the bottom of the chamber containing the catalytic material and may thus be withdrawn therefrom. However, a substantial proportion of the heavy polymers so deposited is converted to heavier polymers and solid carbonaceous matter by the action of the hot gases with the result that the catalytic material is impaired in activity, and when the accumulation of such carbonaceous material becomes too great the catalytic material must be replaced or revivified by burning the carbonaceous material from the catalyst. This operation is difficult and expensive so that ordinarily it is preferable merely to replace the catalyst.

It has been proposed to pass liquid solvent material through the catalytic zone simultaneously with the vapors to effect solution of the deposited polymers in the solvent which flows to the bottom of the chamber, and the solvent and dissolved polymers are then withdrawn from the chamber. Gas oil and heavy naphtha have been suggested for this purpose.

It is an object of the present invention to provide a method of treating cracked vapors in the presence of a solid adsorbent catalytic material with the simultaneous passage therethrough of a solvent for higher-boiling point products of such catalytic treatment which solvent otherwise improves the properties of the resulting motor fuel in that small quantities of the solvent thus introduced, when retained in the final motor-fuel product, assist in stabilizing the motor fuel against subsequent deterioration, in improving the firing properties of the motor fuel, or in improving its properties in other respects. It is also an object of the invention to provide a method of this nature wherein the said solvent is utilized to assist the fractionation of the vapors after withdrawal from the zone of catalytic treatment to effect efficient separation of polymers therefrom. It is a further object of the invention to provide a method of this nature wherein the said solvent addition agent promotes the condensation of polymers in the vapors during the said fractionation following said catalytic treatment.

The present invention contemplates the passage of cracked petroleum vapors of desired end point through a catalytic zone in contact with solid adsorbent catalytic material to effect removal of undesirable gum-forming constituents from the vapors by causing polymerization of these constituents to products having boiling points higher than that of the desired motor-fuel product and passing through said zone concurrently a hydrocarbon derivative which is a liquid solvent for said polymerization products and which constitutes in small quantities a valuable addition agent to the desired motor-fuel product, the removal of the liquid solvent with accompanying dissolved polymers from the catalytic zone, the separation of polymers from the withdrawn solvent, the return of the separated solvent to the catalytic zone for reuse, the recovery of the polymers for treatment elsewhere in the system and the maintenance of the operating conditions to effect incorporation of a small proportion of the said hydrocarbon derivative in the motor-fuel product. The invention further contemplates a process wherein all or a portion of the solvent and addition agent may be introduced into the after-fractionation zone following the catalytic treating zone to assist in the removal of polymers from said vapors by absorption or by assisting in the condensation of said polymers, and the passage of the resulting solution of polymers and solvent to the said catalytic treating zone for use therein with or without the prior separation of any relatively heavy motor-fuel constituents accompanying such a mixture. The invention further contemplates a process of the above nature wherein the vapors from the after fractionation zone are condensed and subjected to separation to effect removal of any excess solvent and addition agent undesired in the motor-fuel product and the return of such separated solvent and addition agent together with any accompanying relatively heavy motor-fuel constituents to the catalytic treating zone for use therein.

The invention further contemplates the use of a solvent and addition agent in the catalytic treating zone which will partially vaporize and pass with the treated cracked vapors to the afterfractionator wherein such vaporized solvent condenses and thereby promotes the condensation and removal of polymers entrained or otherwise carried in the treated vapors.

The choice of the hydrocarbon derivative which constitutes the combined solvent and addition agent will depend on the nature of the catalytic material being used, the nature and quantity of polymers formed in the catalytic treatment and the manner in which it is desired to improve the quality of the resulting motor-fuel product by means of the addition agent and the particular cycle of operations which it is desired to carry out in connection with the present invention. For example, a polyhydric alcohol such as ethylene glycol may be used as a solvent to effect removal of polymers from the catalytic treating zone and from the vapors undergoing treatment, and by leaving a small proportion of this material in the resulting motor-fuel product to stabilize the product against future deterioration by means of oxidation, etc. The solvent used, such as the above-mentioned ethylene glycol, may also have additional advantages in the treatment of the vapors by removing from them oxidizable constituents which might not be removed by the catalytic treatment. Another solvent suitable for the purpose of the present invention is aniline which functions as a solvent for the polymers and at the same time if present in small amounts in the resulting motor fuel product improves the antiknock properties of the gasoline. Another solvent is nitro-benzene which is particularly useful where the motor fuel under treatment is intended for use in Diesel engines and the like, by functioning to promote ignition. The above-mentioned aniline and ethylene glycol are also useful in that their boiling points permit partial vaporization in the catalytic treating zone with the result that the vaporized solvent passes with the treated cracked vapors to the afterfractionation zone for removal by condensation therein whereby concurrent removal by condensation or other means of polymers contained in the vapors is facilitated in the after-fractionation zone. Other materials suitable for use as a combined solvent and addition agent include furfural derivatives, higher monohydric alcohols, esters such as certain of those of carboxylic acids such as dibutyl phthalate, other aromatic amines, higher aliphatic amines and their derivatives, and cyclic nitrogen compounds such as pyridin derivatives.

The accompanying drawing is a diagrammatic view in elevation of apparatus suitable for carrying out the present invention. The invention will be further described more specifically and in detail with reference to the drawing, but it is to be understood that the invention is capable of other modifications which may be beyond the physical limitations of the apparatus described.

Referring to the drawing, a stabilizer or fractionator 1, a catalytic treating tower 2, an afterfractionator 3, strippers 4 and 5, condensers 6 and 7 and separator 8 are indicated together with auxiliary equipment for carrying out the process of the present invention.

Cracked petroleum vapors are introduced into the lower portion of fractionator 1 through line 9 and are subjected to conditions of temperature and pressure therein to effect the separation from the vapors of constituents having boiling points higher than desired in the motor-fuel product to be obtained. The fractionator 1 and the catalytic treating tower 2 may be operated at or below the pressure of the cracking system which may vary from mildly superatmospheric to 400 or more pounds per square inch. The temperature necessary at the selected pressure to accomplish the desired separation in fractionator 1 may be maintained by suitable cooling in the upper portion of the fractionator 1 and (if desired) heating in the lower portion thereof, for example, by cooling means 10 and heating means 11.

The vapors freed of undesired heavier constituents pass from the upper portion of the fractionator 1 through line 12 and are introduced into catalytic treating tower 2. Tower 2 is provided in the known manner with solid catalytic adsorbent material such as fuller's earth supported in the tower by screens, etc. The vapors are introduced near one end of the tower and withdrawn near the other and with a space provided in the bottom of the tower free of catalyst for the collection of liquids condensed in the tower. The vapors may be introduced into the tower in the upper portion thereof and withdrawn from the lower portion or vice versa, but for purposes of illustration the former arrangement is shown in the drawing. The vapors pass downwardly through catalytic treating tower 2 in intimate contact with the catalytic material to effect polymerization of undesirable gum-forming constituents in the vapors whereby such undesirable constituents are converted to products having boiling points higher than that of the desired motor fuel. Concurrently with the passage of vapors through the tower 2 a liquid solvent for the above-mentioned high-boiling polymers, which solvent is a hydrocarbon derivative capable of functioning as a desirable added ingredient for the motor-fuel product to improve its firing properties or resistance to deterioration, as described above, is introduced into the upper portion of tower 2 through line 13 provided with a header 14. This may be a solvent which also assists in stabilizing the remaining motor-fuel constituents against future deterioration and removing oxidizable constituents which may not be removed by the catalytic treatment such as ethylene glycol, or the solvent may also function as an anti-knock ingredient in the motor-fuel product, for example, aniline, or nitrobenzene which may be used when the vapors being treated are intended for use in the production of a motor fuel for Diesel engines, etc. The solvent may be supplied in such quantity that a portion is vaporized and thus combined with the hydrocarbon vapors undergoing treatment in addition to the substantial quantity of unvaporized solvent which goes down through the tower 2 in intimate contact with the vapors, the catalytic material and any liquid polymers deposited on the catalytic material or entrained in the vapors to dissolve such polymers and remove them from contact with the catalytic material and from the vapors undergoing treatment. The solution of solvent and dissolved polymers collects in the bottom of the tower 2 and is withdrawn therefrom through line 14'.

The treated vapors are withdrawn from the lower portion of tower 2 through line 15 and introduced thereby into the lower portion of the after-fractionator 3. The after-fractionator 3 may be operated at a pressure equivalent to or lower than that obtaining in tower 2, a valve 16 being provided in line 15 to effect any desired reduction in pressure. In after-fractionator 3 conditions of temperature and pressure are maintained to effect separation of desired heavy ingredients including polymers formed in the catalytic treatment and entrained in the vapors introduced into the after-fractionator 3. To effect maintenance of the proper temperature conditions at the pressure selected cooling means 17 and heating means 18 may be provided in the top and bottom, respectively, of after-fractionator 3. The vapors remaining from the fractionating treatment are withdrawn from the top of after-fractionator 3 through line 19 which passes through cooling means 7 whereby condensation of the vapors is effected. Line 19 connects with a separator 8 for the introduction therein of the condensed vapors and any uncondensible gases. In separator 8 separation of liquids and gases is effected, the gases being withdrawn from the system through line 20. The liquids collect in the bottom of the separator 8, and any excess solvent carried from after-fractionator 3 with the vapors is separated as a lower layer in the liquids collected in separator 8 and withdrawn therefrom through line 21 which connects with the bottom of separator 8. The motor fuel, freed of undesired gases, gum-forming constituents and polymers thereof and containing a predetermined desired proportion of the solvent, is withdrawn from the side of separator 8 through line 22. A baffle 23 may be provided in separator 8 to facilitate separation of the motor fuel from excess solvent.

The solution of solvent and polymers dissolved therein withdrawn from the bottom of tower 2 through line 14' is introduced into a stripper 4 to effect separation of solvent from the polymers. This may be accomplished by flashing the solution into stripper 4 by substantial reduction in pressure, if the operating pressure of tower 2 is sufficiently high to permit this method, with or without the additional heating of the liquid in stripper 4, or the stripper may be operated at or only slightly below the pressure obtaining in tower 2, and the stripping may be accomplished substantially entirely by the application of heat to the liquids introduced into stripper 4, for example, by the provision of heating means 24 in the bottom of stripper 4. The vaporized solvent is withdrawn from the upper portion of stripper 4 through line 25 provided with a compressor 27 and may include any motor-fuel constituents condensed or otherwise liquefied in tower 2 and withdrawn therefrom through line 14' with the solvent and accompanying polymers. The vapors passing through line 25 are cooled by passage through cooler 6 to effect substantially complete condensation thereof. From cooler 6 the condensate is withdrawn through line 13 for introduction into the upper portion of tower 2, as described above. The excess solvent recovered in separator 8, as described above, and withdrawn therefrom through line 21 may be joined with the solvent passing through line 13 by connecting lines 21 and 13 and the provision of a suitable pump 26 in line 21.

The polymers separated in the bottom of stripper 4 may be withdrawn therefrom and from the system through line 27' provided with a pump 28. If desired, all or a portion of the polymers may be diverted through line 29 and introduced therefrom into the fractionator 1 at various points thereof to recover motor-fuel constituents dissolved in the polymers and effect recovery of the polymers for treatment elsewhere in the system by removing them from fractionator 1 together with undesired heavy constituents of the cracked vapors through line 30 from the bottom of fractionator 1.

If desired, a portion or all of the solvent condensed in cooler 6 may be diverted from line 13 by means of line 31 and introduced into the upper portion of the after-fractionator 3. Under this method of operation the solvent functions as reflux material to furnish a portion or all of the cooling necessary in the upper portion of after-fractionator 3, and in descending to fractionator 3 in countercurrent contact with the ascending vapors it effects removal of polymers from the vapors by absorption or by promoting independent condensation of the polymers together with undesired heavy motor-fuel constituents. The mixture of solvent and motor-fuel constituents and polymers dissolved in the solvent collects in the bottom of fractionator 3 and is withdrawn therefrom through line 32. The mixture of solvent and heavy motor-fuel constituents may be passed without separation for use in the catalytic treating tower 2 by passing it through line 33, connecting line 32 with line 21, whereby the solvent and motor-fuel constituents are transferred to line 13 by means of pump 26 for introduction into the upper portion of tower 2 through the header 14.

If desired, preliminary separation of solvent and motor-fuel constituents may be effected prior to return of solvent to tower 2. By this modification the mixture is passed through line 34 connecting line 32 into stripper 5 wherein the conditions of temperature and pressure are maintained to effect stripping of motor-fuel constituents from the solvent. This may be effected by reduction in pressure if the pressure in the tower 3 is sufficient to permit this operation or by reduction in pressure together with the application of heat, or by the application of heat alone, for example, by means of heating means 35 in the bottom of stripper 5. The solvent, impoverished of motor-fuel constituents, is withdrawn from the bottom of stripper 5 through line 36 which connects with line 21 whereby the solvent is transferred to line 13 by means of pump 26, as described above.

The vaporized motor-fuel constituents separated in stripper 5 may be withdrawn therefrom through line 37 and transferred to the lower portion of fractionator 1 by means of compressor 38 located in line 37.

Fresh solvent may be introduced to the system as needed through line 39 which connects with line 13.

The introduction of the solvent in the after-fractionator 3 is advantageous in effecting maximum contact of the vapors and solvent whereby the desired proportion of solvent is incorporated in the motor-fuel product and to effect a final clean-up of polymers entrained in the motor-fuel vapors or vaporized therewith. The liquid solvent also acts as a reflux material in the fractionation operation carried out in after-fractionator 3.

The return of the solvent together with undesired heavy motor-fuel constituents directly to the catalytic treating tower 2 for use therein effects a refractionation of the heavy constituents and permits the use of the desired heavy constituents to assist in the solvent action to remove polymers from the catalytic material in tower 2. The heaviest portion of the motor-fuel constituents introduced into tower 2 together with the solvent and not vaporized therein by contact with hot vapors passing through tower 2 is withdrawn from tower 2 through line 14' and is recovered with the polymers from the bottom of stripper 4.

The introduction of the fresh solvent in the after-fractionator 3 followed by the use of the solvent containing polymers removed in after-fractionator 3 in the catalytic treating tower 2 makes possible efficient use of the solvent on a countercurrent recycling basis whereby maximum removal of polymers from the motor-fuel vapors is effected with the circulation of a minimum quantity of solvent.

The solvent is selected for its boiling point in addition to its solvent properties and its properties as an addition agent for the motor fuel to facilitate efficient separation of solvent, motor fuel and polymers. In addition, a solvent having a boiling point near that of the motor fuel may be selected whereby vaporization of a substantial proportion of the solvent in tower 2 is effected. The vaporized solvent is withdrawn from the tower 2 through line 15 together with the treated petroleum vapors and is then recovered in the after-fractionator 3 by condensation. The condensation of the solvent promotes the condensation and removal of polymers which are entrained or otherwise carried in the treated vapors.

The present invention provides a novel and useful process of treating cracked petroleum vapors to remove gum-forming constituents therefrom wherein a hydrocarbon derivative, which functions as a solvent for the polymers formed by such treatment and has the property, when added to motor fuel in small quantities, of improving its storage or operating characteristics, is employed to assist in the removal of the gum-forming constituents and the polymers formed therefrom from the zone of treatment and simultaneously incorporate in the resulting motor-fuel product a small proportion of the hydrocarbon derivative whereby additional desirable characteristics are imparted thereto. From the foregoing description it will be seen that many advantages accrue to the operation of the process of the present invention which has been described with reference to a specific modification, as illustrated in the accompanying drawing. It is to be understood, however, that the invention is not limited by such specific references but is capable of other modifications which may be beyond the physical limitations of the apparatus illustrated.

We claim:

1. The method of treating cracked hydrocarbon vapors comprising motor fuel to remove undesirable gum-forming constituents therefrom and impart additional desirable characteristics thereto, which comprises subjecting said vapors to contact with solid adsorbent catalytic material in a treating zone to effect polymerization of undesirable gum-forming constituents to products having boiling points higher than that of the desired motor-fuel product, separating from said vapors said high-boiling polymers, thereafter condensing the treated vapors, intimately contacting said vapors prior to the aforesaid condensation thereof with a liquid solvent to remove said high-boiling polymers therefrom, said solvent being a hydrocarbon derivative capable of functioning as a valuable addition ingredient to the treated motor-fuel product to improve the properties thereof, controlling temperature and pressure conditions of said vapors during contact with said solvent to incorporate a portion of said solvent in the treated vapors, and controlling temperature and pressure conditions during condensation of said vapors to effect retention of a portion of said solvent in said condensate.

2. The method of treating cracked petroleum vapors comprising motor fuel to remove undesirable gum-forming constituents therefrom and impart additional desirable characteristics thereto which comprises subjecting said vapors to contact with solid adsorbent catalytic material in a treating zone to effect polymerization of undesirable gum-forming constituents to products having boiling points higher than that of the desired motor-fuel product, passing through said treating zone simultaneously with said vapors and in intimate contact with said vapors and said catalytic material a liquid solvent for said high-boiling polymers, said solvent being a hydrocarbon derivative capable of functioning as a valuable addition ingredient to the desired motor-fuel product to improve the properties of said motor-fuel product, separating from said vapors the high-boiling polymers, thereafter condensing the treated vapors, controlling temperature and pressure conditions of said vapors during contact with said solvent to incorporate a portion of said solvent in the treated vapors, and controlling temperature and pressure conditions during condensation of said vapors to effect retention of a portion of said solvent in said condensate.

3. The method of treating cracked hydrocarbon vapors comprising motor fuel to remove undesirable gum-forming constituents therefrom and impart additional desirable characteristics thereto, which comprises subjecting said vapors to contact with solid adsorbent catalytic material in a treating zone to effect polymerization of undesirable gum-forming constituents to products having boiling points higher than that of the desired motor-fuel product, separating from said vapors said high-boiling polymers, thereafter condensing the treated vapors, intimately contacting said vapors prior to the aforesaid condensation thereof with a liquid solvent to remove said high-boiling polymers therefrom, said solvent being a hydrocarbon derivative capable of functioning as a valuable addition ingredient to the treated motor-fuel product to stabilize it against future deterioration, controlling temperature and pressure conditions of said vapors during contact with said solvent to incorporate a portion of said solvent in the treated vapors, and controlling temperature and pressure conditions during condensation of said vapors to effect retention of a portion of said solvent in said condensate.

4. The method of treating cracked hydrocarbon vapors comprising motor fuel to remove undesirable gum-forming constituents therefrom and impart additional desirable characteristics thereto, which comprises subjecting said vapors to contact with solid adsorbent catalytic material in a treating zone to effect polymerization of undesirable gum-forming constituents to products having boiling points higher than that of the desired motor-fuel product, separating from said vapors said high-boiling polymers, thereafter condensing the treated vapors, intimately contacting said vapors prior to the aforesaid condensation thereof with a liquid solvent comprising a polyhydric alcohol to remove said high-boiling polymers therefrom, controlling temperature and pressure conditions of said vapors during contact with said solvent to incorporate a portion of said solvent in the treated vapors, and controlling temperature and pressure conditions during condensation of said vapors to effect retention of a portion of said solvent in said condensate.

5. The method of treating cracked hydrocarbon vapors comprising motor fuel to remove undesirable gum-forming constituents therefrom and impart additional desirable characteristics thereto, which comprises subjecting said vapors to contact with solid adsorbent catalytic material in a treating zone to effect polymerization of undesirable gum-forming constituents to products having boiling points higher than that of the desired motor-fuel product, separating from said vapors said high-boiling polymers, thereafter condensing the treated vapors, intimately contacting said vapors prior to the aforesaid condensation thereof with a liquid solvent comprising ethylene glycol to remove said high-boiling polymers therefrom, controlling temperature and pressure conditions of said vapors during contact with said solvent to incorporate a portion of said solvent in the threaded vapors, and controlling temperature and pressure conditions during condensation of said vapors to effect retention of a portion of said solvent in said condensate.

6. The method of treating cracked hydrocarbon vapors comprising motor fuel to remove undesirable gum-forming constituents therefrom and impart additional desirable characteristics thereto, which comprises subjecting said vapors to contact with solid adsorbent catalytic material in a treating zone to effect polymerization of undesirable gum-forming constituents to products having boiling points higher than that of the desired motor-fuel product, separating from said vapors said high-boiling polymers, thereafter condensing the treated vapors, intimately contacting said vapors prior to the aforesaid condensation thereof with a liquid solvent to remove said high-boiling polymers therefrom, said solvent being a hydrocarbon derivative capable of functioning as a valuable addition ingredient to the treated motor-fuel product to improve the anti-knock properties thereof, controlling temperature and pressure conditions of said vapors during contact with said solvent to incorporate a portion of said solvent in the treated vapors, and controlling temperature and pressure conditions during condensation of said vapors to effect retention of a portion of said solvent in said condensate.

7. The method of treating cracked hydrocarbon vapors comprising motor fuel to remove undesirable gum-forming constituents therefrom and impart additional desirable characteristics thereto, which comprises subjecting said vapors to contact with solid adsorbent catalytic material in a treating zone to effect polymerization of undesirable gum-forming constituents to products having boiling points higher than that of the desired motor-fuel product, separating from said vapors said high-boiling polymers, thereafter condensing the treated vapors, intimately contacting said vapors prior to the aforesaid condensation thereof with a liquid solvent comprising aniline to remove said high-boiling polymers therefrom, and controlling temperature and pressure conditions of said vapors and condensate to incorporate a portion of said solvent in the treated vapors thus condensed.

8. The method of treating cracked hydrocarbon vapors comprising motor fuel to remove undesirable gum-forming constituents therefrom and impart additional desirable characteristics thereto, which comprises subjecting said vapors to contact with solid adsorbent catalytic material in a treating zone to effect polymerization of undesirable gum-forming constituents to products having boiling points higher than that of the desired motor-fuel product, separating from said vapors said high-boiling polymers, thereafter condensing the treated vapors, intimately contacting said vapors prior to the aforesaid condensation thereof with a liquid solvent comprising nitrobenzene to remove said high-boiling polymers therefrom, and controlling temperature and pressure conditions of said vapors and condensate to incorporate a portion of said solvent in the treated vapors thus condensed.

9. A method in accordance with claim 2 wherein the conditions of contact of the vapors and the solvent are controlled to effect the inclusion of a substantial proportion of solvent in the vapors, and said vapors are fractionated to separate undesired heavy ingredients therefrom and maintain in the motor-fuel product the desired proportion of solvent.

10. The method in accordance with claim 2 wherein the treated vapors are removed from the treating zone and fractionated in the presence of a substantial quantity of said solvent to effect the removal of undesirable constituents from said vapors after which the solvent is removed from the zone of fractionation and introduced in the catalytic treating zone for use therein.

11. The method of treating cracked petroleum vapors comprising motor fuel to remove undesirable gum-forming constituents therefrom and impart additional desirable characteristics thereto, which comprises subjecting said vapors to contact with solid adsorbent catalytic material in a treating zone to effect polymerization of undesirable gum-forming constituents to products having boiling points higher than that of the desired motor-fuel product, withdrawing treated vapors from said treating zone and subjecting them to fractionation in a fractionating zone to effect separation of polymers and other uncondensed constituents, introducing from an external source in the said fractionating zone a liquid solvent for the said high-boiling polymers, said solvent being a hydrocarbon derivative capable of functioning as a valuable addition ingredient to the treated motor-fuel product to improve the properties thereof, maintaining the conditions of fractionation to effect incorporation of the desired quantity of said solvent in the desired motor-fuel product, thereafter condensing the treated vapors, withdrawing solvent and other condensed material from the said fractionating zone, and introducing said withdrawn solvent into said treating zone whereby the solvent passes through said treating zone simultaneously with the said vapors and in intimate contact with said vapors and said catalytic material to effect solution of high-boiling polymers formed as a result of the catalytic treatment of the vapors.

12. The method in accordance with claim 11 wherein the solvent and other condensibles removed from the said fractionating zone are treated to effect separation of the solvent and motor-fuel constituents prior to passage of the solvent to said catalytic treating zone.

HORACE B. COOKE.
MALVIN R. MANDELBAUM.